United States Patent Office 2,754,297
Patented July 10, 1956

2,754,297

PREPARATION OF AMINOALKYL-ESTERS OF PENICILLIN

John T. Sheehan, East Bound Brook, and William A. Lott, Maplewood, N. J., assignors to Olin Mathieson Chemical Corporation, New York, N. Y., a corporation of Virginia No Drawing. Application March 16, 1953,
Serial No. 342,750

10 Claims. (Cl. 260—239.1)

This invention relates to the preparation of ester salts of penicillin.

Since the advent of penicillin, many forms of the antibiotic have been developed, each for a specific purpose. Thus, for prompt action by injection, the potassium or sodium salt of penicillin is used in sterile, pyrogen-free distilled water, isotonic sodium chloride solution or 5% dextrose solution; and for prolonged action by injection, an insoluble salt of penicillin, such as the procaine salt, is used. For inhalation, penicillin liquid aerosol and dust are available; and for oral use penicillin is available in tablet form. More recently, ester salts, such as the hydriodide of the diethyl aminoethyl ester of penicillin, have been proposed for use in the treatment of pulmonary diseases. [See, for example, Flippen, H. F. et al., J. Phila. Gen. Hosp. 3, 57–60 (1952).]

It is the object of this invention to provide an improved method for the preparation of such ester salts of penicillins.

The chemical literature gives various methods for the preparation of penicillin ester hydrohalides, but no satisfactory method has been developed to give the high yields obtained by the process of this invention due to difficulties in esterification and/or salt formation. Thus, attempted esterification of the carboxyl group of penicillin by treatment of its silver salt with an alkyl iodide has been found to be virtually inoperative; and the process involving treatment of the anhydride of penicillin with β-diethylaminoethanol (J. A. C. S., 70, pp. 2964–6, 1948) has been found to be unsatisfactory due to the difficulty in preparing the anhydride. Another literature method comprises treating a penicillin salt with a dialkylaminoalkyl halide to form an ester, isolating this ester, forming the ester hydrohalide, then treating said hydrohalide with a soluble iodide, such as potassium iodide, to form the ester hydriodide; however, a poor yield is obtained by this method.

According to the process of this invention, which is notable not only because of the high yield obtained, but also because of the economy stemming from its single-step operation, a water-soluble penicillin salt, an amine halide hydrohalide and a halide salt (all as defined hereinafter) are mixed together in a suitable solvent; and the ester salt which forms is separated. Yields of 50% or more have been obtained using this simplified procedure.

Graphically, the process (and the reactants) may be represented as follows:

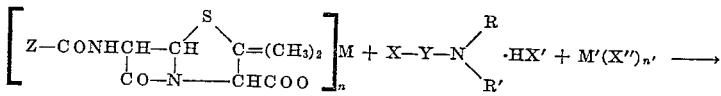

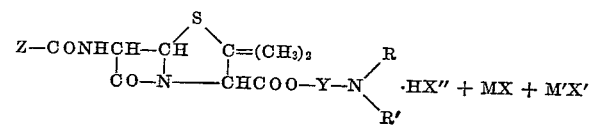

(balanced for situation where $n$ and $n'$ are each equal to 1) wherein: Z is the appropriate residue of a penicillin; M is an alkali or alkaline-earth group cation or an alkylammonium cation; M' is an alkali or alkaline-earth group cation; Y is alkylene, preferably lower alkylene; R and R' are each lower alkyl (the same or different) or together with N, form a heterocyclic ring; and X, X' and X" are halogens, having an atomic number from 17 to 53, both inclusive, each of X and X' having an atomic number no greater than that of X".

Any of the known penicillins may be used in the process of this invention. Thus, the residue Z may be $\Delta^2$-pentenyl, benzyl, p-hydroxybenzyl, heptyl, amyl, butylthiomethyl, allylmercaptomethyl, etc. with the benzyl species preferred. The M and M' radicals are preferably sodium, potassium, calcium, magnesium, trimethylammonium, triethylammonium, etc., with potassium preferred. As to the amine reactant, the alkylene group (Y) is preferably ethylene, but may be any other lower-alkylene group, such as methylene, isopropylene, butylene, pentylene, etc.; and the groups R and R' are so chosen that the amino group

is a group, such as dimethylamino, diethylamino, diisopropylamino, methyl ethylamino, ethyl isopropylamino, piperidino, morpholino, etc., with diethylamino preferred. The halogens, X, X' and X" may include any of the combinations within the scope of the definition given above. The combination wherein X and X' are chlorine and X" is iodine is preferred. However, other combinations may also be used (e. g. X and X' are chlorine and X" is bromine; or X and X' are bromine and X" is iodine; or X is chlorine, X' is bromine and X" is iodine).

The reaction is preferably carried out in an anhydrous organic solvent, of which isopropanol and dimethylformamide are preferred. However, other solvents may be used, such as acetone, butanol, dimethylacetamide and tetrahydrofuran. Broadly, any organic solvent which is inert to the reaction is utilizable in the process of this invention.

The reaction is advantageously carried out at room temperature. However, the temperature may be raised or lowered to hasten or slow down the speed of reaction.

Following are specific working examples illustrative of the invention. However, these examples are by no means to be considered as limiting the invention.

*Example 1*

A mixture of 37.3 g. potassium penicillin G, 17.5 g. diethylaminoethyl chloride hydrochloride and 17 g. potassium iodide in 200 ml. isopropanol is stirred for 20–24 hours at room temperature. The hydriodide of the diethylaminoethyl ester of penicillin G (containing inorganic salts as an impurity) which separates out, is filtered off, then washed with about 25 ml. isopropanol. A slurry is made by adding the residue to 100 ml. water; and, after agitating the slurry for 30 minutes, the ester hydriodide is separated by filtration. A slurry of the resulting residue is again made in 100 ml. water, stirred for 30 minutes and filtered. On air drying, about 30 g. purified ester hydriodide (M. P. 170–172° C.) is obtained.

*Example 2*

A mixture of 6.1 g. dimethylaminoisopropyl chloride hydrochloride, 18.7 g. potassium penicillin G and 16 g. potassium iodide in 250 ml. dimethylformamide is heated on a steam bath for about 30 minutes. The reaction mixture is then allowed to cool and the hydriodide of the dimethylaminoisopropyl ester of penicillin G, which precipitates, is separated by filtration, washed once with dimethylformamide then washed three times with water to obtain the purified ester hydriodide giving the following assay values:

|  | U./mg. |
|---|---|
| Estimated potency | 1030 |
| Chemical | 685 |
| Biological | 514 |

*Example 3*

A mixture of 16 g. β-dimethylaminoethyl bromide hydrobromide, 15 g. sodium penicillin G and 15 g. sodium iodide in 200 ml. dimethylformamide are heated on a steam bath for about 30 minutes. The reaction mixture is then allowed to cool and the precipitated hydriodide of the β-dimethylaminoethyl ester of penicillin G is separated by filtration, washed once with dimethylformamide, then twice with water to obtain the purified product.

*Example 4*

A mixture of 13.6 g. diethylaminoethyl chloride hydrobromide, 45 g. trimethylamine salt of penicillin G and 16 g. potassium iodide in about 250 ml. dimethylformamide are heated on a steam bath for about 30 minutes. The reaction mixture is then allowed to cool and the precipitated hydriodide of the diethylaminoethyl ester of penicillin G is separated by filtration. The ester hydriodide is washed, once with dimethylformamide, then twice with water to obtain a purified product, M. P. 169–171° C.

*Example 5*

A mixture of 20 g. β-morpholinoethyl chloride hydrochloride, 37 g. potassium penicillin G and 16 g. potassium bromide in about 200 ml. isopropanol is heated on a steam bath for about 30 minutes. The reaction mixture is then allowed to cool, and the precipitated hydriodide of the β-morpholinoethyl ester of penicillin G is separated, washed once with isopropanol, then with water; and the resulting product is air-dried.

*Example 6*

Following the procedure of Example 1 except that the sodium salt of allylmercaptomethyl penicillin is used in place of the penicillin salt of that example, the hydriodide of the diethylaminoethyl ester of allylmercaptomethyl penicillin is obtained.

*Example 7*

A mixture of 18.7 g. potassium pencillin G, 6.8 g. β-pyrrolidinoethyl chloride hydrochloride and 8 g. potassium iodide in about 100 ml. isopropanol is heated on a steam bath for about 30 minutes. The reaction mixture is then allowed to cool, and the precipitated hydriodide of the β-pyrrolidinoethyl ester of penicillin G is separated by filtration, washed once with isopropanol, then with water; and the resulting product is air dried [M. P. 185–186° C.; potency, estimated: 1,000 u./mg., found: 710 u./mg. (biological), 974 u./mg. (chemically)].

We claim:

1. The process which includes mixing an alkali metal salt of penicillin with at least a stoichiometric amount of each of an amine halide of the formula

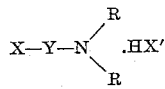

and a halide of the formula $M'(X'')_n$, wherein X, X', and X'' are halogens having an atomic number from 17 to 53, both inclusive, and each of X and X' having atomic numbers no greater than that of X''; Y is lower alkylene; and

is a radical selected from the group consisting of di(lower alkyl)amino, piperidino, and morpholino; M' is selected from the group consisting of an alkali and an alkaline earth metal cation; and $n$ is the valence of M'; and separating the resulting hydrohalide salt of the penicillin ester from the reaction mixture.

2. The process of claim 1 wherein $M'(X'')_n$ is an alkali metal iodide.

3. The process of claim 2 wherein R and R' are lower alkyl, and X and X' are chloride.

4. The process of claim 3 wherein the alkali metal iodide is potassium iodide.

5. The process of claim 1 wherein the cation of the penicillin salt is a member of the group consisting of sodium and potassium.

6. The process of claim 5 wherein the inert solvent is isopropanol.

7. The process of claim 5 wherein the inert solvent is dimethylformamide.

8. The process of claim 5 wherein Y is ethylene, and R and R' are each ethyl.

9. The process of claim 8 wherein the inert solvent is isopropanol.

10. The process of claim 8 wherein the inert solvent is dimethylformamide.

References Cited in the file of this patent

UNITED STATES PATENTS

| 2,694,061 | Frederiksen et al. | Nov. 9, 1954 |

FOREIGN PATENTS

| 499,168 | Belgium | Nov. 30, 1950 |